April 1, 1941.  W. M. WILSON  2,237,020
ROTARY PLUG VALVE
Filed June 30, 1939  2 Sheets-Sheet 1
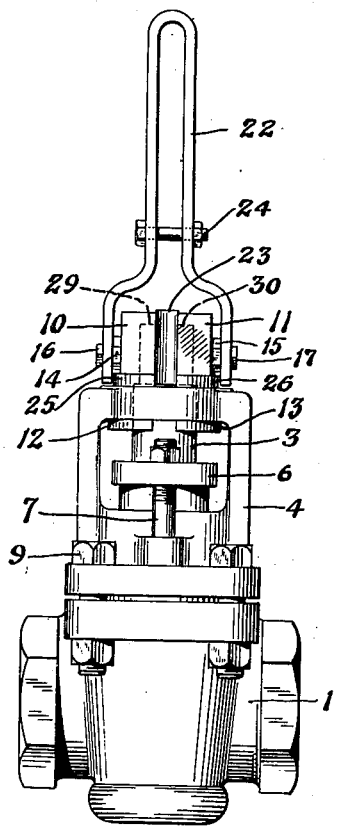
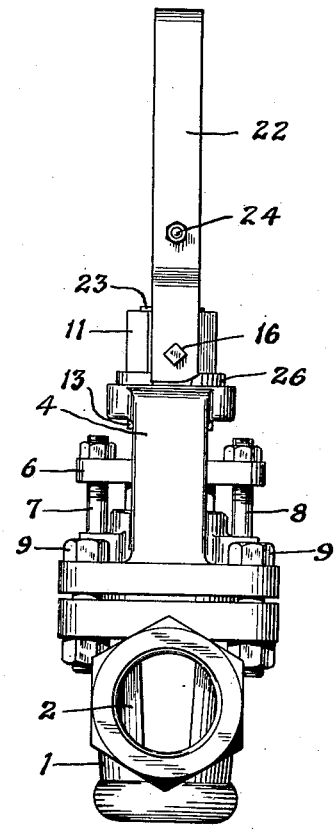
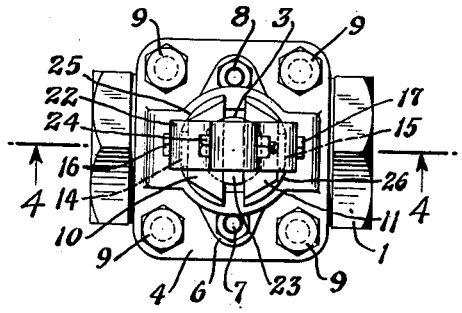
INVENTOR.
Warren M. Wilson
BY Darby & Darby
ATTORNEYS April 1, 1941.  W. M. WILSON  2,237,020
ROTARY PLUG VALVE
Filed June 30, 1939   2 Sheets-Sheet 2

INVENTOR.
Warren M. Wilson
BY Darby&Darby
ATTORNEYS

Patented Apr. 1, 1941

2,237,020

UNITED STATES PATENT OFFICE 2,237,020

ROTARY PLUG VALVE

Warren Marlin Wilson, Wayne, Pa.

Application June 30, 1939, Serial No. 282,093

7 Claims. (Cl. 251—97)

This invention relates to valves of the rotary plug type for use in controlling the flow of different fluids, such as shown for example in United States patent to E. C. McFarlane, No. 2,142,795, issued January 3, 1939, and British patent No. 244,017, complete accepted December 10, 1925.

An object of this invention is to provide a rotary plug valve which will be simple in operation, cheap to manufacture and assemble, rugged in construction, and which will withstand operating strains with minimum wear.

A feature of the invention is the provision of "ob-round" hole or bearing surface in the plug stem or projection thereof to provide satisfactory wear on soft material and to provide a close fit with a shaft eccentrically mounted within said hole, and permit lateral displacement of the shaft.

Another feature of the invention is the provision of an eccentric shaft mounted within a plug stem in combination with means for rotating said stem and shaft without lost motion between the stem and shaft.

Another feature of the invention is the provision of eccentric bushings permitting a variety of slight adjustments of the position of the plug within the valve.

Another feature of the invention is the provision of a rotary plug valve capable of simple and easy assembly, adjustable to various positions in use, and providing easy means for varying the adjustments.

Another feature of the invention is the provision of a split handle which may be easily removed to permit adjustment of the valve.

In the drawings—

Figure 1 is a side elevation of my new plug valve;

Figure 2 is an end view thereof;

Figure 3 is a plan view thereof;

Similar reference numerals refer to the same parts throughout.

Figure 4:
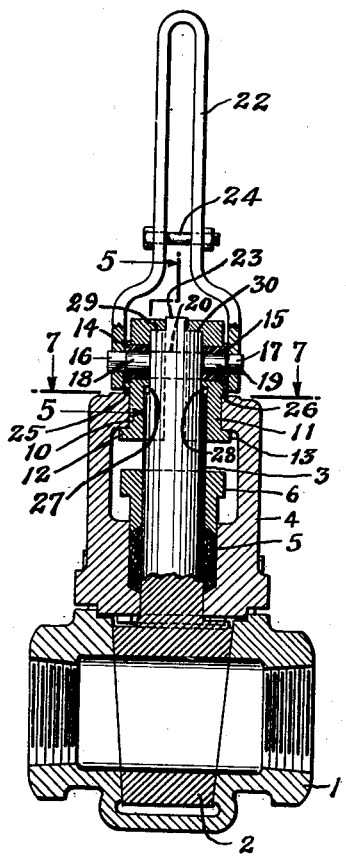
Figure 4 is a sectional view along the lines 4—4 of Figure 3.

The valve body 1 has therein a plug 2 having a stem 3. A bonnet 4 surrounds the stem and is provided with packing 5 held in place by packing gland 6. Bolts 7 and 8 hold the packing gland in position on the bonnet. Bolts 9 hold the bonnet to the valve body.

Figure 5:
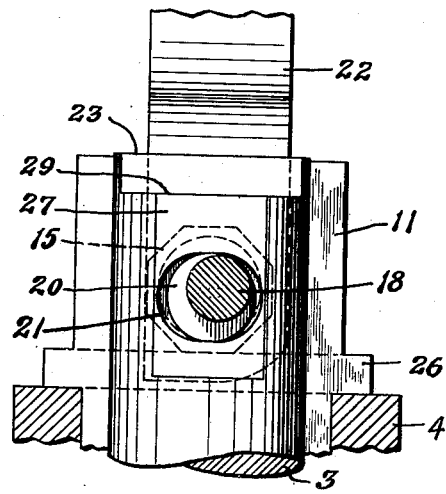
Figure 5 is an enlarged sectional view along the lines 5—5 of Figure 4.

Split bushings 10 and 11 have grooves therein providing lower shoulders 12 and 13 engaging the upper end of the bonnet, and upper shoulders similarly engaging the upper end of the bonnet. Each of the split bushings has a hole drilled therethrough to accommodate eccentric bushings 14 and 15 which terminate in octagonal heads which engage suitable shoulders 25, 26 on the split bushings. The eccentric bushings 14 and 15 in turn have holes drilled therein which accommodate the portions 18, 19 of the eccentric shaft 16—18—20—19—17. The stem 3 has an "ob-round" hole 21 (Fig. 5) drilled therein to accommodate the portion 20 of the eccentric shaft. The eccentric shaft terminates at the ends in bolt heads 16, 17 which fit suitable openings in a handle 22. The stem 3 is of circular cross-section from the plug up through the packing gland and into the split bushings 10, 11. Within the split bushings the stem is ground to have opposite flat sides providing shoulders 27, 28 which underlie corresponding shoulders on the split bushings with sufficient clearance to permit adjustment of the plug. The flat portion continues to nearly the top of the split bushings where additional shoulders 29, 30 are provided on the stem by reducing the distance between the opposite parallel sides. This provides a narrow top 23 for the stem having flat parallel sides which engage upper inward projections on the split bushings 10, 11 and provide what is essentially a machine key between the bushings and the stem.

The handle 22 may be made of spring steel which is placed in position and firmly secured by means of bolt 24.

Referring now to the eccentric shaft 16—18—20—19—17 it will be noted that the opposite ends 16—17 have the shape of bolt heads to engage the handle 22 so that the handle may turn the entire shaft. The next sections 18—19 of the eccentric shaft are of small diameter and are surrounded by eccentric bushings 14, 15. The central portion 20 of the eccentric shaft is of larger diameter than the portions 18—19 and its axis is eccentric with respect to the axis of the portions 18—19. The central portion 20 fits within the "ob-round" hole 21 in the stem 3. This hole has flat parallel sides for a short distance and semi-circular ends. The flat parallel sides are spaced apart a distance equal to the diameter of the portion 20 of the eccentric shaft and the same semi-circular ends have a radius equal to the radius of the portion 20 of the eccentric shaft. The result is that the portion 20 fits snugly against both the top and the bottom of the "ob-round" hole and may be moved therein on the axis of the portions 18, 19 to raise the stem and to have sufficient lateral movement for clearance.

Figure 7:
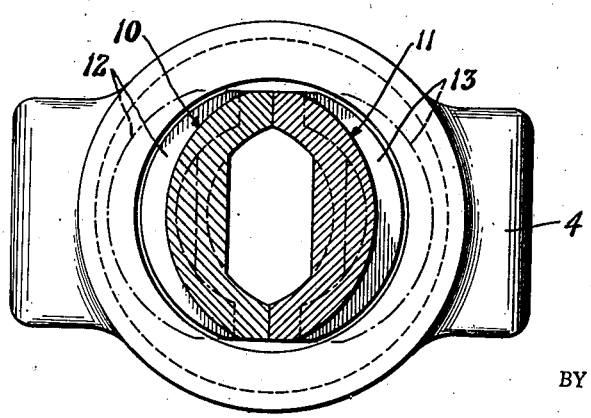
Figure 7 is a section along the line 7—7 of Figure 4 illustrating the assembly of the valve before the stem is inserted.

The method of assembling my new valve is indicated in Figure 7, taken in connection with the other figures. In the assembly the split bushings 10 and 11 would first be placed within the bonnet 4, as indicated in Figure 7. They would then be spread apart as indicated by the dotted lines in Figure 7 to receive the stem. It will be noted that the outer peripheries of shoulders 12, 13 have the same radius of curvature as the circular opening in the top of the bonnet so the split bushings, when held together, may be passed therethrough.

The packing gland 6 is then inserted between the sides of the bonnet 4 to be in position to receive the stem. The stem is then pushed up through the bonnet 4, gland 6, and split bushing 10, 11 from the bottom. The eccentric shaft 16-18-20-19-17 is then placed in position in the opening in the stem and the eccentric bushings 14, 15 placed in position around the portions of the shaft 18, 19. The gland is then packed, the valve body placed in position, the bolts inserted and tightened by the nuts, the handle placed in position and tightened by the bolt 24 and its nut, and the assembly is complete.

Figure 6:
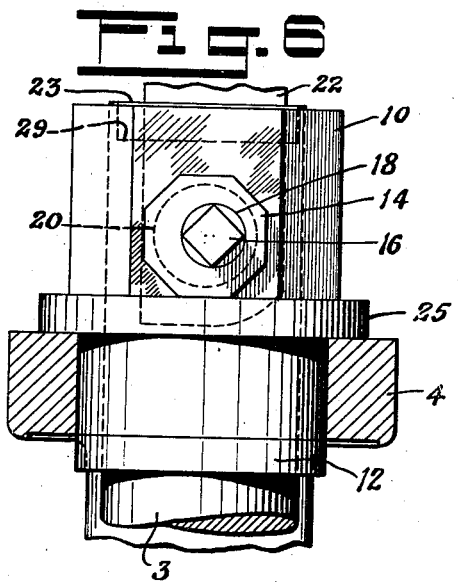
Figure 6 is an end elevation of that portion of the valve including the structure shown in section in Figure 5.

From Figure 6 it will be noted that the holes within the eccentric bushings 14, 15 which accommodate the portions 18, 19 of the eccentric shaft, are drilled slightly off the axis of the eccentric bushings. The octagonal heads on the eccentric bushings therefore provide eight different adjustments for the eccentric bushings, providing eight different positions for the valve stem and plug. In other words, with the valve adjusted as shown in the drawings, the valve will seat in the valve body at a certain position. If, however, it is desired to make a slight change in the adjustment the handle is removed, the split bushings 14, 15 pulled out far enough to release their heads from the shoulders 25, 26 on the split bushings 10 and 11 which they engage, and the eccentric bushings 14, 15 rotated until a new surface of their heads is in position to engage the shoulders. The bushings are then pushed back into position. In pushing them back so they again rest on their shoulders, the valve stem will have been raised or lowered by the amount corresponding to the eccentricity of the holes through the eccentric bushings. Thus, if it is found that the valve seats into the valve body too tightly, the valve will be adjusted as just described, so that it is raised slightly. If, on the other hand, the seat is not sufficiently firm, the valve will be adjusted so that it may seat slightly further. These possible adjustments not only permit a slight latitude in machining the valve body, the valve and parts thereof, but also provide means for compensating for wear in use of the valve. Thus, after the valve has been in use some time and subject to many operations, it may be lowered slightly to compensate for the wear to which its surfaces have been subjected.

It will be noted that the portions 18, 19 of the eccentric shaft fit snugly within the eccentric bushings 14, 15 which in turn fit snugly within the split bushings 10, 11, which split bushings in turn terminate at their upper ends in the inner projections which key them to the upper end 23 of the valve stem 3. Thus when it is desired to rotate the valve the handle is of course lowered in the usual manner and then rotated. The surfaces to which the pressure is first applied for rotation will be the portions 16, 18, 19, 17 of the eccentric shaft. This pressure is transmitted directly to the eccentric bushings, then to the split bushings, and through them to the portion 23 of the stem 3. There is therefore no rotational pressure applied to the portion 20 of the eccentric shaft which remains fixed in position while the valve is rotated. It will likewise be observed that there is no lost motion between the split bushing and the valve stem, these having the same arcuate and flat surfaces at each surface of contact, thus eliminating excessive wear and strain on such surfaces as were present in previous devices. Also there is no lost motion between the split bushings and bonnet 4, these also having the same arcuate surfaces at points of contact, eliminating wear and strain at these points.

It is possible with my device to eliminate these non-arcuate surfaces because the necessary lateral movement is taken up within the "ob-round" hole 21. As the portion 20 of the eccentric shaft is equal in diameter to the distances between the flat surfaces of this hole, and also equal in radius to the radius of curvature of the arcuate sides of the hole, it is always in contact with opposite surfaces thereof so that there is no lost motion to be taken up on either the raising or lowering of the handle 22. The wear is thus evenly distributed through all parts of the device.

It is to be understood, of course, that I do not limit myself to the specific details of the device as shown and described, but intend to include as my invention everything within the scope of the appended claims.

What is claimed is:

1. In a rotary plug valve, a stem having an opening therethrough, a pair of split bushings having openings therethrough, a pair of eccentric bushings mounted within the openings in said split bushings and in turn having openings therethrough, a handle having openings therethrough, and an eccentric shaft mounted within the openings in said stem, eccentric bushings and handle, and having a diameter equal to the various diameters of the openings in said eccentric bushings and stem and terminating in ends having flattened surfaces fitting within the openings in said handle.

2. In a rotary plug valve comprising a seat, plug and stem, the combination of a pair of split bushings rotatable with the stem, a pair of eccentric bushings mounted in said split bushings, an eccentric shaft rotatably mounted in said eccentric bushings, and an ob-round hole in the valve stem through which said eccentric shaft passes and with which it cooperates to impart axial movement to the stem and plug.

3. In a rotary plug valve comprising a seat, plug and stem, the combination of a pair of split bushings rotatable with the stem, a pair of eccentric bushings mounted in said split bushings, an eccentric shaft rotatably mounted in said eccentric bushings, an ob-round hole in the valve stem through which said eccentric shaft passes and with which it cooperates to impart axial movement to the stem and plug, and a handle fixed for rotation with said eccentric shaft, said handle being mounted on said shaft externally of said split bushings.

4. In a rotary plug valve comprising a seat, plug and stem, the combination of a pair of split bushings rotatable with the stem, a pair of eccentric bushings mounted in said split bushings, an eccentric shaft rotatably mounted in said eccentric bushings, and an ob-round hole in the valve stem through which said eccentric shaft passes and with which it cooperates to impart axial movement to the stem and plug, said split bushings having shoulder portions, said eccentric bushings having flat-sided portions adapted to cooperate with said shoulder portions, whereby said eccentric shaft may raise or lower to adjust the range of seating movement of the valve plug.

5. In a rotary plug valve comprising a seat, plug, stem and bonnet, the combination of a pair of split bushings rotatably mounted in the bonnet and surrounding the same, a shaft supported in said split bushings and extending transversely thereof, an ob-round hole in the stem through which said shaft passes, and flat portions on said bushings and the stem adapted to cooperate, whereby pressure applied to said shaft to cause rotation thereof about an axis perpendicular thereto is transmitted through said split bushings and stem, said ob-round hole preventing transmission of pressure directly from said shaft to said stem.

6. In a rotatable plug valve comprising a seat, plug, stem and bonnet, the combination of a pair of split bushings rotatably mounted in the bonnet and surrounding the same, eccentric bushings mounted in said split bushings on a diameter thereof, an ob-round hole in the valve stem, an eccentric shaft extending through said split bushings and said ob-round hole, and a bifurcated handle adapted to rotate said shaft, said handle being fastened to said shaft externally of said split bushings, said handle fastening means comprising polygonal holes in the bifurcations of said handle cooperating with polygonal terminations of the shaft.

7. In a rotary plug valve comprising a seat, plug, stem and bonnet, the combination of a pair of split bushings rotatably mounted in the bonnet and surrounding the stem, a pair of eccentric bushings rotatably mounted in holes in said split bushings, an ob-round hole in the valve stem, an eccentric shaft extending through said ob-round hole and rotatably mounted in said eccentric bushings, rotation of said eccentric bushings serving to adjust the range of movement of the valve plug, means for rotating the eccentric shaft to cause movement of the valve plug within the adjusted range, and means on said split bushings and cooperating with the valve stem whereby the stem and plug of the valve may be rotated after operation of said shaft to position the stem and plug at one extreme of their range of movement.

WARREN M. WILSON.